United States Patent [19]

Ensign

[11] Patent Number: 4,674,800
[45] Date of Patent: Jun. 23, 1987

[54] CAR SAFETY SEAT

[76] Inventor: Gordon S. Ensign, 1644 Sierra Ave., Seaside, Calif. 93955

[21] Appl. No.: 826,908

[22] Filed: Feb. 6, 1986

[51] Int. Cl.$^4$ .................... A47C 31/00; A47D 13/08
[52] U.S. Cl. ..................................... 297/465; 297/464
[58] Field of Search ................ 280/801, 806; 297/465, 297/464

[56] References Cited

U.S. PATENT DOCUMENTS

| | | |
|---|---|---|
| 1,573,446 | 2/1926 | Popham . |
| 1,584,161 | 5/1926 | Bear . |
| 1,591,571 | 7/1926 | Stwalley . |
| 1,616,349 | 2/1927 | Cagle . |
| 2,508,822 | 5/1950 | Goldberg . |
| 2,571,823 | 10/1951 | Bonk . |
| 2,833,344 | 5/1958 | Lucht . |
| 2,908,324 | 10/1959 | Muller et al. ................ 297/465 |
| 3,099,486 | 7/1963 | Scott ................ 297/465 |
| 3,125,375 | 3/1964 | Bird et al. . |
| 3,144,273 | 8/1964 | P'Simer et al. . |
| 3,220,769 | 11/1965 | Regan . |
| 3,321,247 | 5/1967 | Dillender . |
| 3,388,947 | 6/1968 | Rosen . |
| 3,713,695 | 1/1973 | Von Wimmersperg ............ 297/384 |
| 3,827,716 | 8/1974 | Vaughn et al. ............. 280/150 AB |
| 3,833,946 | 9/1974 | Von Wimmersperg .................. 5/94 |
| 3,992,028 | 11/1976 | Abe et al. ............................ 280/728 |
| 3,992,040 | 11/1976 | Gannac ................................ 280/744 |
| 4,099,770 | 7/1978 | Elsholz et al. ....................... 297/216 |
| 4,230,366 | 10/1980 | Ruda .................................... 297/487 |
| 4,235,474 | 11/1980 | Rosenberg ........................... 297/465 |
| 4,291,915 | 9/1981 | Cox ..................................... 297/193 |
| 4,341,421 | 7/1982 | Rowley ............................... 297/465 |
| 4,366,587 | 1/1983 | Takada ................................... 5/94 |
| 4,461,510 | 7/1984 | Cunningham et al. ............. 297/250 |
| 4,469,377 | 9/1984 | O'Rourke ............................ 297/464 |
| 4,568,125 | 2/1986 | Sckolnik .............................. 297/465 |
| 4,571,000 | 2/1986 | Holder ................................. 297/465 |

FOREIGN PATENT DOCUMENTS 2227744  11/1974  France .................. 280/801

Primary Examiner—James T. McCall
Attorney, Agent, or Firm—Cushman, Darby & Cushman

[57] ABSTRACT

A child-restraining car safety seat usable by infants and children of varying sizes includes an outer pouch having leg and arm holes. Vertical anchor straps are securable around a car seat or to the vehicle frame and are releasably attachable to the pouch for holding the pouch in position against the seat. A generally horizontally extending torso strap loops around the anchor straps and the pouch. The armholes are sufficiently long to allow the straps to be inserted from behind into the sides of the pouch so that they may be applied directly around a child seated in the pouch. Also included is an inner pouch attached to the back of the outer pouch for accommodating a child or infant smaller than the largest child which can be accommodated in the outer pouch. The inner pouch is positioned such that the torso strap is in alignment with the torso of a child or infant held in the inner pouch. The torso strap is adjustable in different vertical positions to accommodate different sized persons using the safety seat. The range of vertical positions is limited by the use of loop-forming straps attached to the back of the outer pouch or by releasable snaps attaching the anchor straps to the back of the pouch.

11 Claims, 8 Drawing Figures

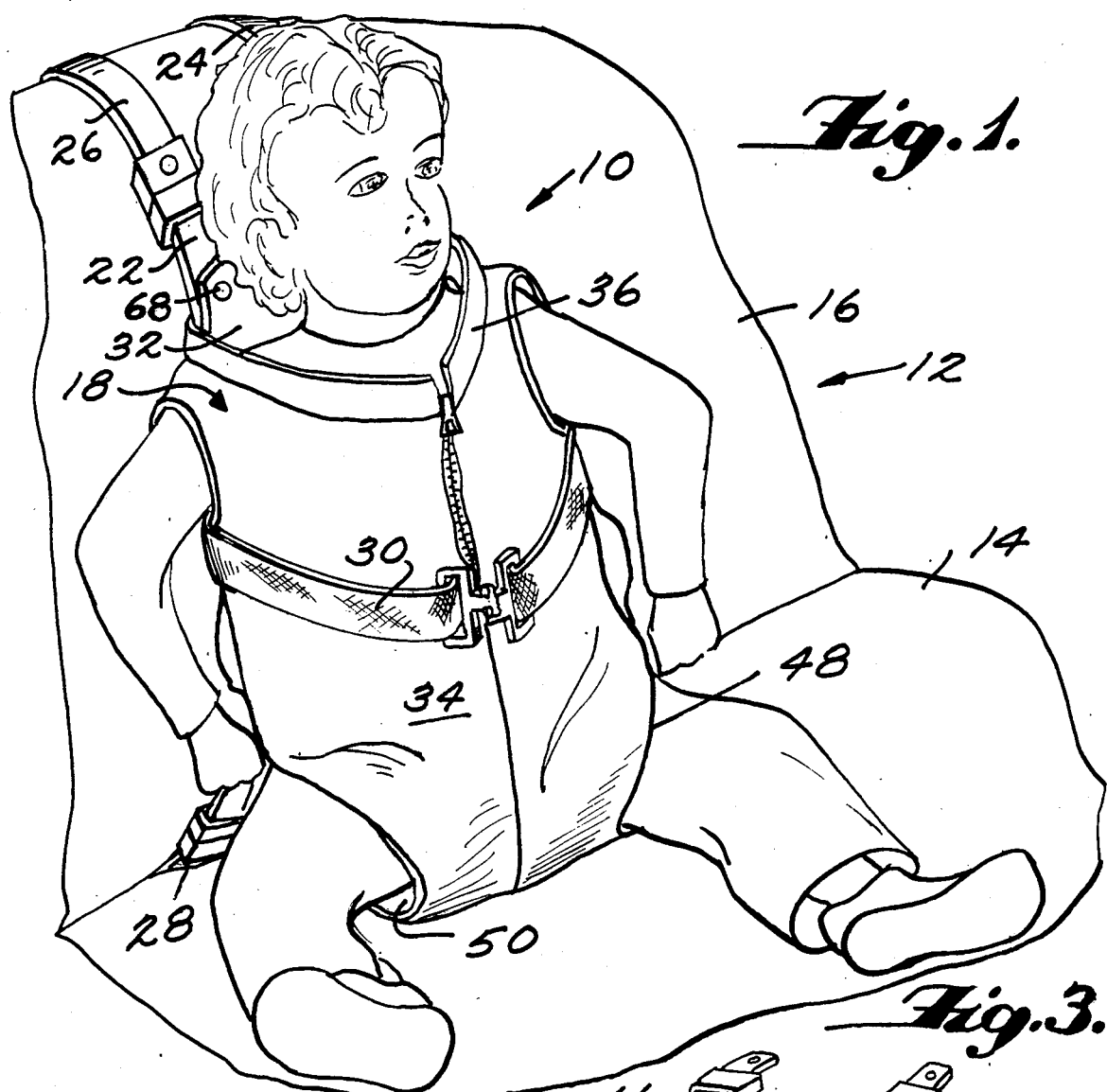
Fig. 1.
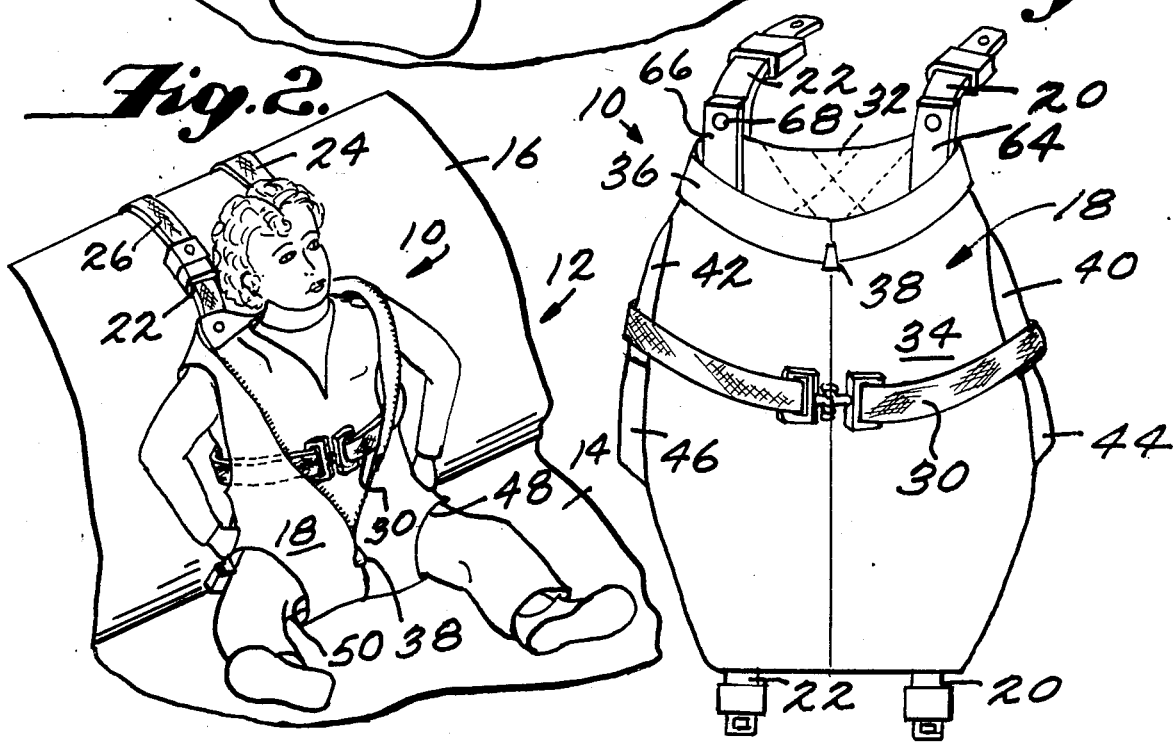
Fig. 2.
Fig. 3.

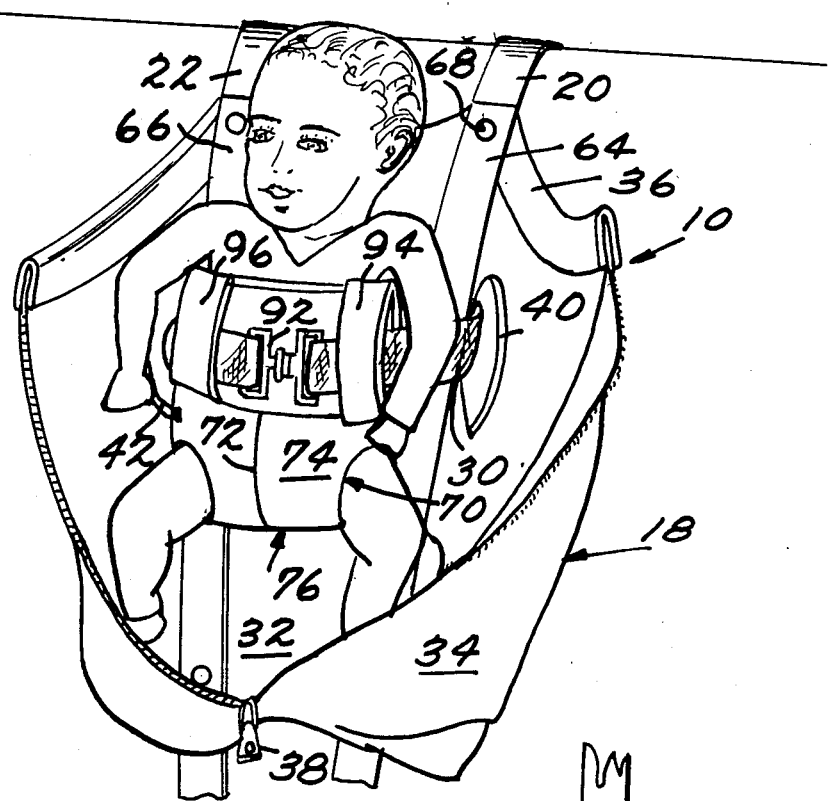
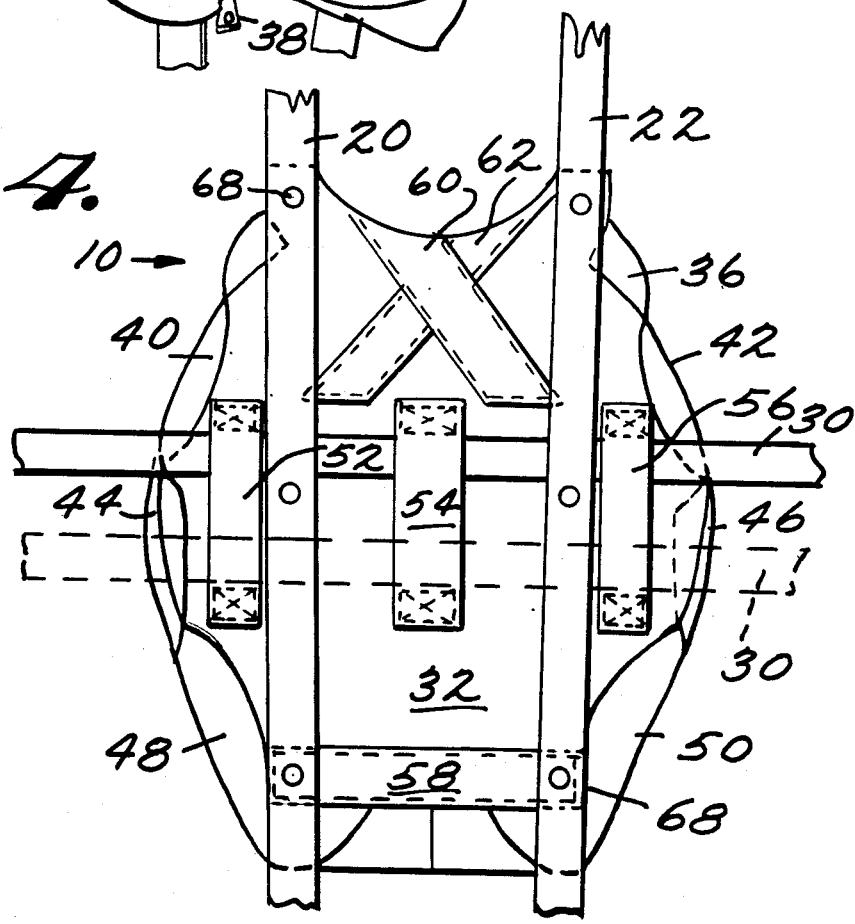

CAR SAFETY SEAT

BACKGROUND AND SUMMARY OF THE INVENTION

This invention relates to a safety seat for holding children in a constrained position against a car seat. More particularly, it relates to such a safety seat having a pouch for holding a child, and a safety belt positioned to extend around the torso of a child accommodated in the pouch.

The safety benefits of restraining devices for securing car passengers in a car during collisions and other accidents is well-known. Many states are now requiring occupants of vehicles to use seat belts while traveling.

Seat belts installed in cars by the car manufacturer are effective when used by adults but are ineffective or unsafe when used for infants or children. Various types of add-on restraining devices have been devised for use by infants or children. It is important that such devices hold the child or infant in a secure position while providing her or him sufficient support and comfort. Many child-restraining devices use specialized chairs or frames which take up a lot of room when not in use and tend to be expensive to construct and maintain.

One of the main problems with most of these devices also is that they are constructed to accommodate infants or children of a limited size range. Restraining belts are often an integral part of the device and are fixed in position, regardless of the size of the child restrained by the device. Besides not accommodating children of a wide range of sizes, the portion of the device in contact with the infant or child is not easily removed from the belts for use out of the car or for cleaning.

The present invention improves on these devices by providing a safety car seat which allows the child or infant to be held in a comfortable and safe position against the car seat. A safety seat made according to the invention may be constructed to accommodate children and infants of a wide range of sizes. Further, the safety seat can be made of soft, comfortable material which is washable and can easily be removed from the vehicle, so that the child can continue to be held in the safety seat for added warmth and protection. The seat also can be easily removed and washed by separating it from the restraining straps which hold the child to the vehicle seat back.

These and other advantages are obtained by a car safety seat made according to the present invention. Included is a pouch for holding the torso of a child. Further, the pouch has a back securable to a car seat and has a safety torso belt which extends around the pouch for holding the child securely. This torso belt is adjustable lengthwise along the pouch to accommodate the torsos of different sized individuals. The invention may also provide a second pouch positioned inside the first pouch and against the back of the first pouch so that the torso of a small child or infant supported in the second pouch is in line with the torso belt. This second pouch is compressable so that it presses against the back of the first pouch when a child occupies the first pouch.

These and additional features and advantages of the present invention will be more clearly understood from a consideration of the drawings and the following detailed description of the preferred embodiments.

BRIEF DESCRIPTION OF THE DRAWINGS

With reference to the accompanying three sheets of drawings:

FIG. 1 is a side front perspective view of a safety car seat made according to the present invention as installed in a car against a car seat and as used by a large child;

FIG. 2 is a view similar to FIG. 1 showing an optional connection of the torso safety belt;

FIG. 3 is a front perspective view of the car seat of FIG. 1;

FIG. 4 is a rear perspective view of the safety seat of FIG. 3 with associated straps only partially shown;

FIG. 5 shows a front perspective view of the safety seat of FIG. 1 showing an inner pouch occupied by an infant;

DETAILED DESCRIPTION OF THE PREFERRED EMBODIMENTS

Figure 6:
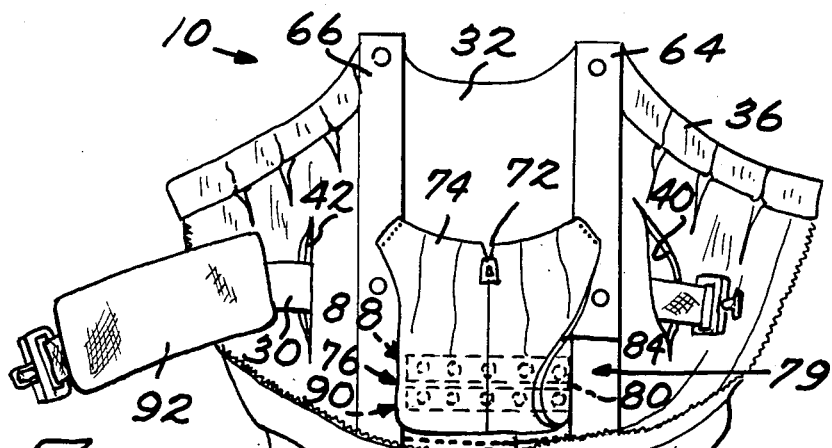
FIG. 6 is a view similar to FIG. 3 with the outer pouch unzipped and laid open to show internal construction.

Referring initially to FIGS. 1-4, and particularly to FIG. 1, a car safety seat 10 constructed according to the present invention is shown secured to a car seat 12 having a generally horizontally extending bottom 14 and generally vertically extending car seat back 16. Safety seat 10 includes a first or outer pouch 18, a pair of vertically extending anchor straps 20, 22, which are removably secured to pouch 18 and are securable, in the arrangement shown, using conventional seat belt construction, to the car seat back 16, or preferably, to the car frame by connection to mating securing straps. Pouch 18 is preferably made of a washable fabric which is non-abrasive to the skin, such as cotton. The color and texture of the fabric can be coordinated with the interior fabric of the vehicle in which the safety seat is to be used. Exemplary securing straps are shown as straps 24, 26 which extend over the top of seat 16 and lower securing strap 28 (and another lower securing strap not shown in FIG. 1) extending between car seat back 16 and bottom 14.

Shown extending generally horizontally or sideways around pouch 18 and anchor straps 20, 22, as particularly shown in FIG. 4, is a pouch-securing torso belt or strap 30. Strap 30 includes a buckle, preferably disposed in the front so that it can be easily separated to allow a child or infant to be placed in or removed from safety seat 10. It will be understood, although it is not shown, that strap 30 also includes a conventional adjustment mechanism so that strap 30 may be adjusted to fit snugly the torso of a person accommodated in the safety seat.

Pouch 18 includes a back or back stretch of material 32 and a first or outer front stretch of material 34. Back 32, and therefore pouch 18, is considered to have a length extending from top to bottom as viewed in FIG. 1 which corresponds to the length of the torso of a person held in pouch 18. Disposed around the top margin of front 34 is a collar 36 preferably made of a soft, non-abrasive material, which collar defines a head and neck opening in the top of seat 10. A zipper 38 is shown connecting right and left panels of front 34. This zipper is unzipped when a child or infant is being placed in seat 10 and then is zipped up to a comfortable level corresponding to the size of the occupant of the safety seat.

Pouch 18 also includes a pair of armholes 40, 42, each disposed on an opposite side of the pouch. Below the armholes are a couple of side panels 44, 46 disposed one each immediately below each of the armholes, as shown, which provide a reinforced fabric region to accommodate force concentrations which could be applied to them during a collision. Disposed immediately below panels 44, 46 are a pair of leg openings 48, 50, respectively. These leg openings are disposed at the bottom of the pouch, as shown.

Now directing attention particularly to FIG. 4, the back of safety seat 10 is shown. Disposed in a horizontal row along the back are three positioning straps 52, 54, 56 which are sewn at upper and lower ends to back 32. These straps and the associated back material to which they are attached can be seen to form loops through which torso strap 30 extends. It can be seen that, in the position shown in FIG. 4, torso strap 30, while retained in the loop formed by the positioning straps, extends above the bottom edge of the armholes. Thus, as shown in FIG. 1, strap 30 may be strapped around the outside of pouch 18 in any vertical positions allowed by positioning straps 52, 54, 56, such as the alternate position shown in phantom lines. Alternatively, strap 30 may be extended internally into pouch 18 by passing it into armholes 40, 42, as shown in FIG. 2 and, as will be subsequently described, in FIG. 5. In use, strap 30 is positioned at a vertical position appropriate for the size of a person accommodated in pouch 18.

To increase the strength of back 32 of pouch 18, several reinforcing strips have been sewn into it. This includes a generally horizontally disposed strip 58 located across the bottom of back 32, a pair of crossed strips 60, 62 disposed at the top, and a pair of vertical strips 64, 66 sewn to the front facing surface of back 32, as more clearly shown in FIGS. 3 and 5. A set of releasable snap portions are disposed along vertical strip 64, 66 to mate with corresponding snap portions disposed in anchor straps 20, 22, to form snaps 68, as shown. Snaps 68 allow anchor straps 20, 22 to remain mounted against car seat 16 while the pouch is removed from the car. Further, torso strap 30 may be removed from the pouch by sliding it through the loops defined by straps 52, 54, 56. Alternatively, anchor straps 20, 22 and torso strap 30 may be left secured to pouch 18 by unbuckling the anchor straps from the securing straps described previously.

It is important when repositioning pouch 18 against car seat 12 that torso strap 30 pass through positioning straps 52, 54, 56 and between the car seat back 16 and anchor straps 20, 22. If a collision were to occur and a child occupying pouch 18 is thrown forward, then torso strap 30 will be anchored by anchor straps 20, 22 so that movement of the child is limited.

Another salient feature of the present invention will now be described with reference to FIGS. 5, 6 and 7 which show the inner construction of safety seat 10. FIG. 5 shows zipper 38 unzipped and the front side panels of front 34 spread open to show an infant disposed in an inner or second pouch 70. Pouch 70 is mounted to the back 32 of pouch 18 intermediate the top and bottom of the back, as shown. As more clearly shown in FIGS. 6 and 7, pouch 70 includes a front zipper 72 similar to zipper 38 in front 34. It can be seen that inner pouch 70 is formed by a front stretch 74 which is connected at two top opposite corners to vertical reinforcing strips 64, 66 on back 32.

A flap 76 of front panel 74 is connected along an intermediate stretch 78 to back 32. Stretch 78 contains a generally horizontally disposed row 79 of snap portions 80. Two corresponding, vertically disposed rows 88, 90 of snap portions 82 are mounted on back 32. Snap portions 80 mate with snap portions 82 to form a row of snaps. Flap 76, when attached to back 32, thus defines a seat portion having leg openings 84, 86. It can be seen that with snap row 79 of intermediate stretch 78 fastened to upper row 88, as shown in FIGS. 6 & 7, flap 76 is disposed higher than when row 79 is connected to row 90, as represented by the lower edge of flap 76 shown in phantom lines in FIG. 6. This permits the general positioning of the middle of an infant's torso in line with torso strap 30, as shown in FIG. 5.

This preferred embodiment of the present invention also includes a padded cushion 92 which is shown positioned between strap 30 and the chest of a child in safety seat 10. The buckle and belt of torso strap 30 thus do not apply as great a force to the occupant during a collision as would strap 30. Cushion 92 includes a couple of holding straps 94, 96 for holding cushion 92 in position under strap 30 as shown. It will be understood that cushion 92 can also be used when a person is held in pouch 18.

Figure 7:
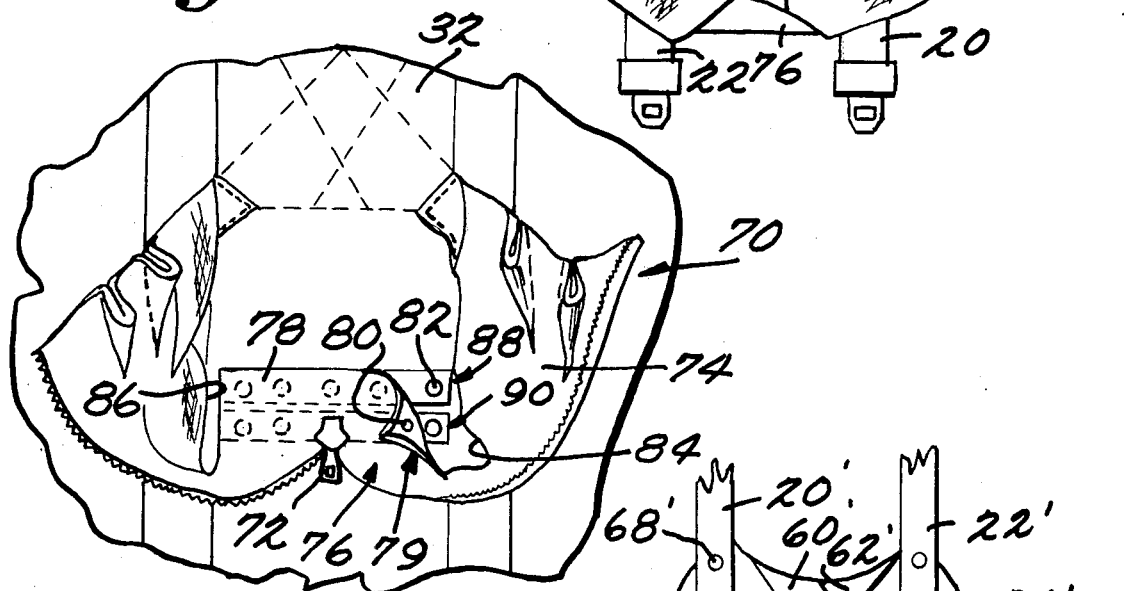
FIG. 7 is an enlarged view of the inner pouch of FIG. 6 which pouch is shown opened up.

Still referring to FIG. 7, the preferred embodiment of the present invention also includes pleats 75 formed along the upper margin of front panel 74. These pleats make pouch 70 small enough to securely hold a small infant. As the child grows, these pleats may be let out to make pouch 70 roomier. Eventually, the child will reach a size wherein it is difficult to fit the child in pouch 70, even with all the pleats let out. When this happens, the child is placed in outer pouch 18 with the inner pouch 70 forming part of the back to the pouch. This is not uncomfortable since it is made of a compressable soft fabric. As described previously, outer pouch 18 will accommodate the growth of the child for a period of years so that a single safety car seat will be usable until the child is big enough to use standard seat belts installed in the car.

In the following discussion, a second preferred embodiment of the invention is described. The various parts are referenced with numerals having a prime. The parts are given like numerals because of the similarity in construction. These parts have the same structure as described previously except for the differences which are discussed.

Figure 8:
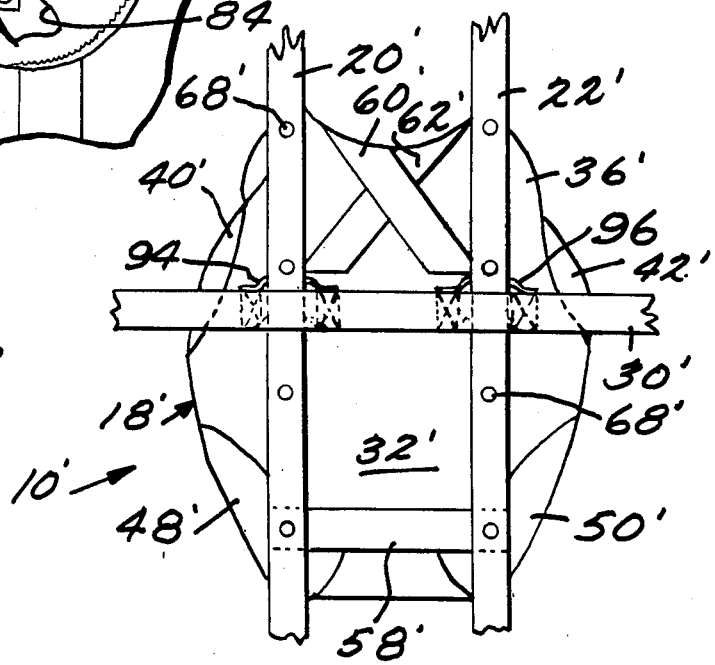
FIG. 8 is a rear view similar to FIG. 4 showing an alternative strap configuration.

Referring now to FIG. 8, a modified structure for retaining strap 30' relative to anchor straps 20', 22' is shown. This form of the embodiment, shown as safety seat 10', allows a pouch 18' to easily be removed from straps 20', 22' while retaining torso strap 30' in position relative to the anchor straps. This is provided by loop means which define loops or enclosures through which straps 20', 22' pass. These loops are formed by a pair of horizontal holding straps 94, 96, associated with anchor straps 20', 22', respectively. The ends of straps 94, 96 are sewn or otherwise suitably attached to torso strap 30' so that anchor straps 20', 22' can pass through them freely. It will be noted that it is preferable that torso strap 30' be located behind, and straps 94, 96 in front of, anchor straps 20', 22', as shown in FIG. 8 so that the holding force is directly between the torso strap and the anchor straps.

It will be noted that the portions of middle snaps 68 on each of anchor straps 20, 22, and the corresponding snap portions on back 32, of safety seat 10 shown in FIG. 4, are replaced by two vertically spaced snaps 68' on safety seat 10'. These snaps are spaced far enough apart to allow positioning of torso strap 30' in alignment with armholes 40', 42', as discussed previously for safety seat 10. Thus, strap 30' can be adjusted along a similar vertical range of positions which in this case is defined by the two inner sets of spaced snaps 68'.

It will be appreciated that it is economical to use a car seat made according to the present invention, particularly as described with reference to the preferred embodiments, since the single seat is usable for most of the early life of a child. Correspondingly, it can be seen that the seat is also usable, at different times, to accommodate children or infants of differing sizes without having to purchase safety seats of different sizes.

It will also be appreciated that other embodiments of the present invention may also be made. For instance the outer pouch could be made in various forms, such as without armholes or without leg holes. The inner pouch could be lowered and additional positioning straps added to permit the torso strap to be positioned lower as well. Also, the outer pouch could be made with a single anchoring strap, or could be positioned on the car seat bottom rather than against the seat back to permit a child to lay down while travelling. In this position an anchoring strap could be connected to conventional seat belts.

While the invention has been particularly shown and described with reference to the foregoing preferred embodiments, it will be understood by those skilled in the art that other changes in form and detail may be made therein without departing from the spirit and scope of the invention as defined in the claims.

What I claim is:

1. A car safety seat usable on a car seat, comprising:
   first pouch means sized to hold the torso of a person and having a back disposable against the car seat, having sides, and having a length corresponding to the should-to-leg length of a torso held in it;
   anchor strap means attachable to the car and to said first pouch means for securing said back of said first pouch means against the car seat;
   torso strap means positioned to extend sideways across said first pouch means for securing the torso of the person held in said first pouch means;
   means for connecting said torso strap means relative to said anchor strap means for securing said first pouch means, and therefore the torso of a person held in said first pouch means, against said anchor strap means so that the position of said torso strap means is adjustable along the length of said first pouch means; and
   second pouch means disposed inside said first pouch means, connected to the back of said first pouch means, and sized smaller than said first pouch means so that the largest torso held by said second pouch means is smaller than the largest torso held by said first pouch means.

2. The safety seat of claim 1 wherein said first pouch means includes leg openings through which the legs of a person whose torso is held by said first pouch means extends, which first pouch means further includes means for adjusting the size of the leg openings.

3. A car safety seat for children of different sizes and usable on a car seat, comprising:
   first pouch means sized to hold the torso of a person, and having a back disposable against the car seat, having sides, and having a top and bottom defining a length corresponding to the length of a torso held in it;
   compressable second pouch means disposed in and sized smaller than said first pouch means, said second pouch means being attached to the back of said first pouch means so that the largest torso held by said second pouch means is smaller than the largest torso held by said first pouch means; and
   means for securing the back of said first pouch means on the car seat.

4. The safety seat of claim 3 wherein said second pouch means includes a flap attachable along an intermediate stretch to the back of said first pouch means to form a seat portion defining leg openings, said flap being selectively attachable at different lengthwise positions along the back of said first pouch means to vary the distance from said seat portion to the bottom of said first pouch means.

5. The safety seat of claim 3 wherein said securing means includes lengthwise extending anchor strap means fixedly attachable relative to the car seat back, the back of said first pouch means being attachable along its length to said anchor strap means.

6. The safety seat of claim 5 wherein said back of said first pouch means is releasably attachable to said anchor strap means.

7. The safety seat of claim 5 which further includes sideways extending torso strap means positionable across the torso of a person seated in one of said first and second pouch means and attachable relative to said anchor strap means for securing the torso of a person held in one of said first and second pouch means, and means for connecting said torso strap means relative to said anchor strap means for securing said pouch means against said anchor strap means so that said torso strap means is variably lengthwise positionable relative to said first and second pouch means and said anchor strap means, to allow positioning of said torso strap means at different lengthwise positions.

8. The safety seat of claim 7 wherein said first pouch means includes a pair of holes, one disposed on each side of said first pouch means, said holes being aligned with said torso strap means to allow said torso strap means to pass through said holes and internally through said first pouch means.

9. The safety seat of claim 7 wherein said second pouch means is positioned along the back of said first pouch means so that said torso strap means is aligned with said second pouch means, and therefore with both the torso of a person held in said first pouch means and the torso of a person held in said second pouch means.

10. The safety seat of claim 3 adapted for use in a car seat having a car seat back and generally horizontally extending car seat surface and said supporting means supports said first pouch means on the car seat back with said bottom of said first pouch means disposed on the horizontally extending car seat surface, so that a person held in said first pouch means is also seated on the horizontally extending car seat surface.

11. The safety seat of claim 10 wherein said second pouch means is disposed relative to said first pouch means so that the torso of a person held therein is positioned above the horizontally extending car seat surface.

* * * * *